(12) United States Patent
Holzman

(10) Patent No.: US 7,156,303 B1
(45) Date of Patent: Jan. 2, 2007

(54) SHOPPING SYSTEM AND METHOD

(75) Inventor: Thomas G. Holzman, Marietta, GA (US)

(73) Assignee: NCR Corporation, Dayton, OH (US)

( * ) Notice: Subject to any disclaimer, the term of this patent is extended or adjusted under 35 U.S.C. 154(b) by 175 days.

(21) Appl. No.: 10/947,699

(22) Filed: Sep. 23, 2004

(51) Int. Cl.
G06K 15/00 (2006.01)
G06K 19/06 (2006.01)
G06Q 20/00 (2006.01)
G06Q 1/12 (2006.01)

(52) U.S. Cl. .................. 235/383; 235/492; 705/21; 705/16

(58) Field of Classification Search .............. 235/383, 235/378, 380, 487, 492; 705/16, 17, 21
See application file for complete search history.

(56) References Cited

U.S. PATENT DOCUMENTS

| | | | | |
|---|---|---|---|---|
| 5,559,313 A * | 9/1996 | Claus et al. | | 705/30 |
| 5,640,002 A * | 6/1997 | Ruppert et al. | | 235/462.46 |
| 6,367,694 B1 * | 4/2002 | Roslak | | 235/380 |
| 6,550,672 B1 * | 4/2003 | Tracy et al. | | 235/383 |
| 6,681,989 B1 * | 1/2004 | Bodin | | 235/383 |
| 6,725,206 B1 * | 4/2004 | Coveley | | 705/414 |
| 6,760,796 B1 * | 7/2004 | Rossmann et al. | | 710/72 |
| 7,012,528 B1 * | 3/2006 | Mathewson et al. | | 340/572.1 |
| 7,076,441 B1 * | 7/2006 | Hind et al. | | 705/10 |
| 7,107,221 B1 * | 9/2006 | Tracy et al. | | 705/1 |
| 2002/0050526 A1 * | 5/2002 | Swartz et al. | | 235/472.02 |
| 2002/0092912 A1 * | 7/2002 | Hamilton et al. | | 235/462.46 |
| 2002/0165758 A1 * | 11/2002 | Hind et al. | | 705/10 |
| 2002/0194074 A1 * | 12/2002 | Jacobs | | 705/16 |
| 2003/0135417 A1 * | 7/2003 | Bodin | | 705/16 |
| 2004/0143505 A1 * | 7/2004 | Kovach | | 705/23 |
| 2005/0040230 A1 * | 2/2005 | Swartz et al. | | 235/383 |
| 2005/0061870 A1 * | 3/2005 | Stockton | | 235/380 |
| 2005/0194440 A1 * | 9/2005 | Sato | | 235/383 |
| 2005/0234778 A1 * | 10/2005 | Sperduti et al. | | 705/22 |
| 2006/0065716 A1 * | 3/2006 | Peters | | 235/380 |
| 2006/0072787 A1 * | 4/2006 | Claudatos et al. | | 382/103 |
| 2006/0085297 A1 * | 4/2006 | Minerley | | 705/28 |
| 2006/0122934 A1 * | 6/2006 | White et al. | | 705/50 |

* cited by examiner

Primary Examiner—Daniel Walsh
(74) Attorney, Agent, or Firm—Paul W. Martin

(57) ABSTRACT

A shopping system and method which reduces resources necessary for completing transactions. The shopping system includes an item recording computer for recording item identification information associated with an item selected for purchase by a shopper in a store, for recording identifying information about the shopper from an RFID identifier carried by the shopper, and for storing the item identification information in a data file associated with the identifying information of the shopper.

15 Claims, 3 Drawing Sheets

SHOPPING SYSTEM AND METHOD

BACKGROUND OF THE INVENTION

The present invention relates to security systems for stores and more specifically to a shopping system and method.

Stores that have departments selling "consumable" items (e.g., snacks, restaurant food, and gasoline) currently require payment at each place where the items are purchased. Likewise, photo processing departments usually require shoppers to pay in that department, and a department selling suits often requires advance payment for alterations before the shopper can leave. Making multiple payments during the course of a single store visit adds work for the shopper, reduces the time available for making additional purchases, requires in-store labor to process each individual payment, and adds to the load placed on the store's computing resources and point of sale systems for processing purchases.

Therefore, it would be desirable to reduce the resources spent at each payment site.

SUMMARY OF THE INVENTION

In accordance with the teachings of the present invention, a shopping system and method is provided.

The shopping system includes an item recording computer for recording item identification information associated with an item selected for purchase by a shopper in a store, for recording identifying information about the shopper from an RFID identifier carried by the shopper, and for storing the item identification information in a data file associated with the identifying information of the shopper.

It is accordingly an object of the present invention to provide a shopping system and method.

It is another object of the present invention to reduce resources necessary for completing transactions.

BRIEF DESCRIPTION OF THE DRAWINGS

Additional benefits and advantages of the present invention will become apparent to those skilled in the art to which this invention relates from the subsequent description of embodiments and the appended claims, taken in conjunction with the accompanying drawings, in which:

DETAILED DESCRIPTION

Figure 1:
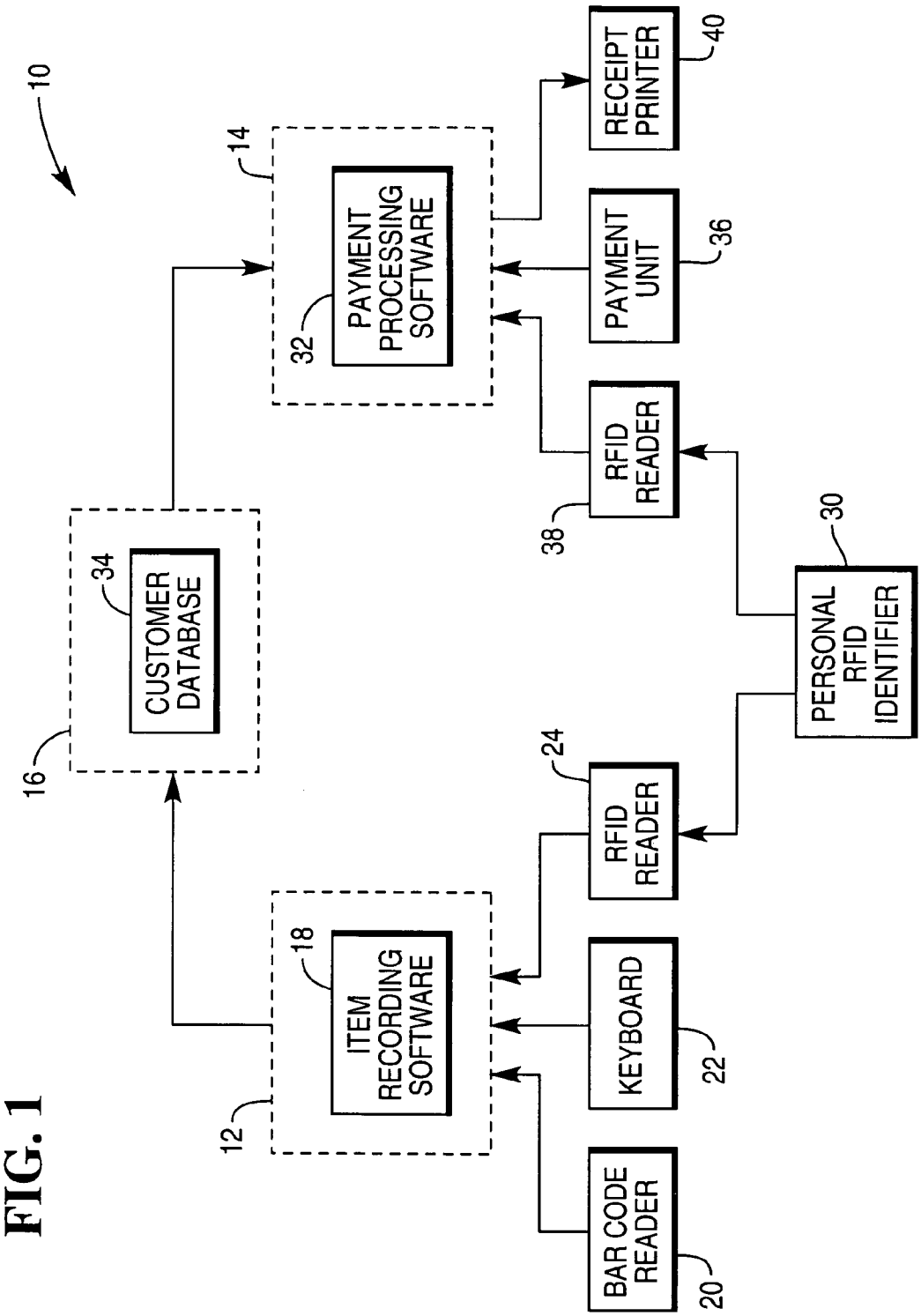
FIG. 1 is a block diagram of a transaction system.

Referring now to FIG. 1, transaction system 10 includes item recording computer 12, payment processing computer 14, and server 16.

Item recording computer 12 executes item recording software 18, which records items selected for purchase by shoppers. Item recording software 18 obtains information about selected items from bar code reader 20, keyboard 22, or radio frequency identification (RFID) reader 24.

Item recording software 18 also records shopper identification information from a shopper's personal RFID identifier 30 through RFID reader 24 and stores items selected by the shopper in customer database 34. Personal RFID identifier 30 may be incorporated into a loyalty card or key fob.

There may be many item recording computers 12 throughout a store, mall, or large shopping area. Item recording software 18 establishes a running tab each time a shopper selects an item. Item recording computers 12 may be self-service or assisted-service computers.

Payment processing computer 14 executes payment processing software 32, which records shopper identification information from personal RFID identifier 30 through RFID reader 38 and obtains a list of items selected by the shopper from customer database 34. Payment processing software 32 processes payment through payment unit 36, which may include a card reader, check reader, cash acceptor and dispenser, or a combination thereof. Payment processing computer 14 prints a receipt through receipt printer 40. Payment processing computer 14 may be located at a checkout area, such as an exit.

Server 16 stores customer database 34. In addition to a list of customers, their personal RFID label information, and their selections, customer database 34 may also include payment information, such as credit card information. Shoppers may elect to automatically apply the stored payment information to selected items unless the shoppers choose to checkout at payment processing computer 14. Automatic payment would allow a customer to make selections and walk out of the store, mall, or shopping area.

Alternatively, personal RFID identifier 30 may store item selections. During checkout at payment processing computer 14, payment processing software 32 obtains the list of item selections from personal RFID identifier 30 through RFID reader 38.

Figure 2A:
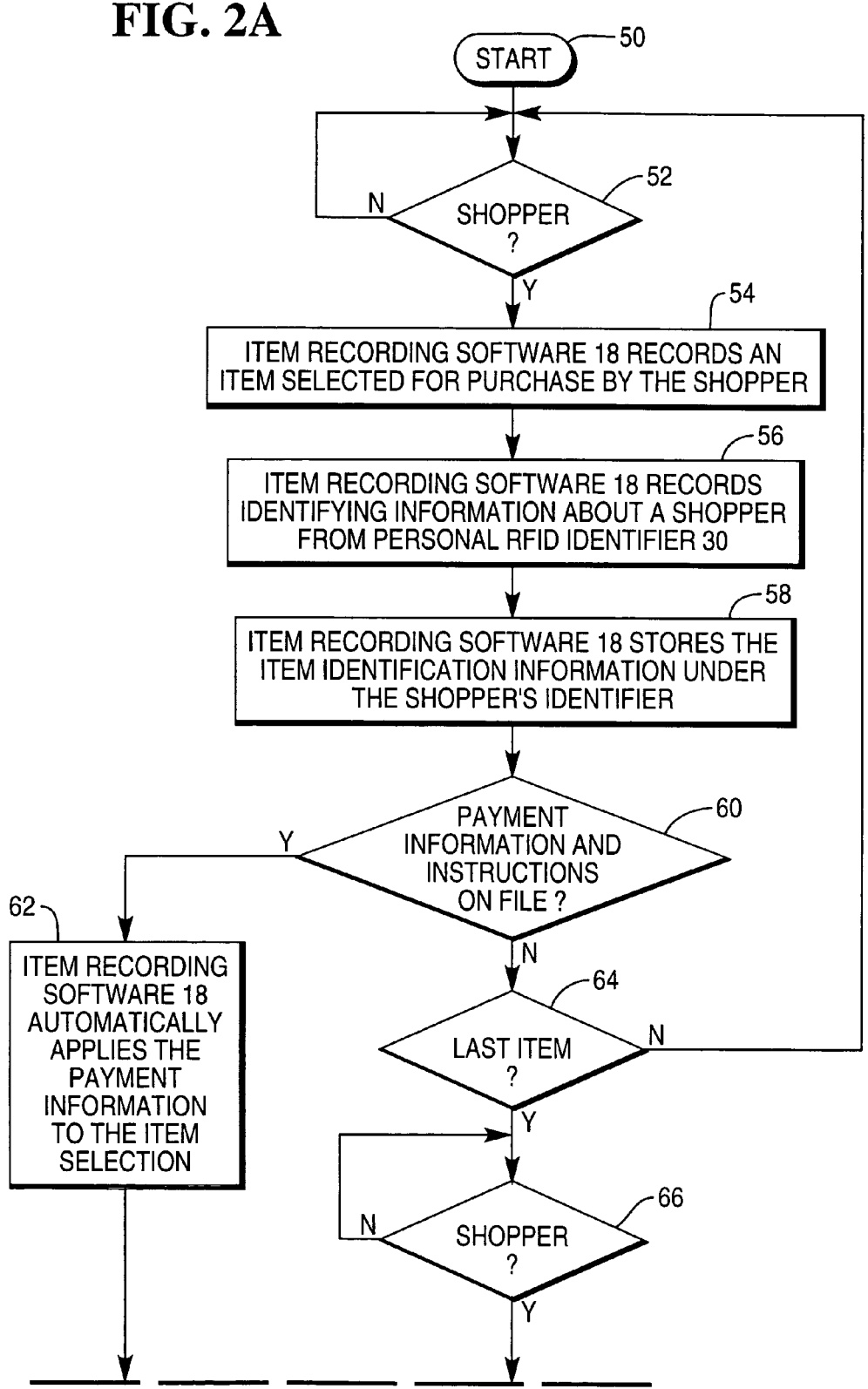
FIG. 2 is a flow diagram illustrating operation of the transaction system.
Figure 2B:
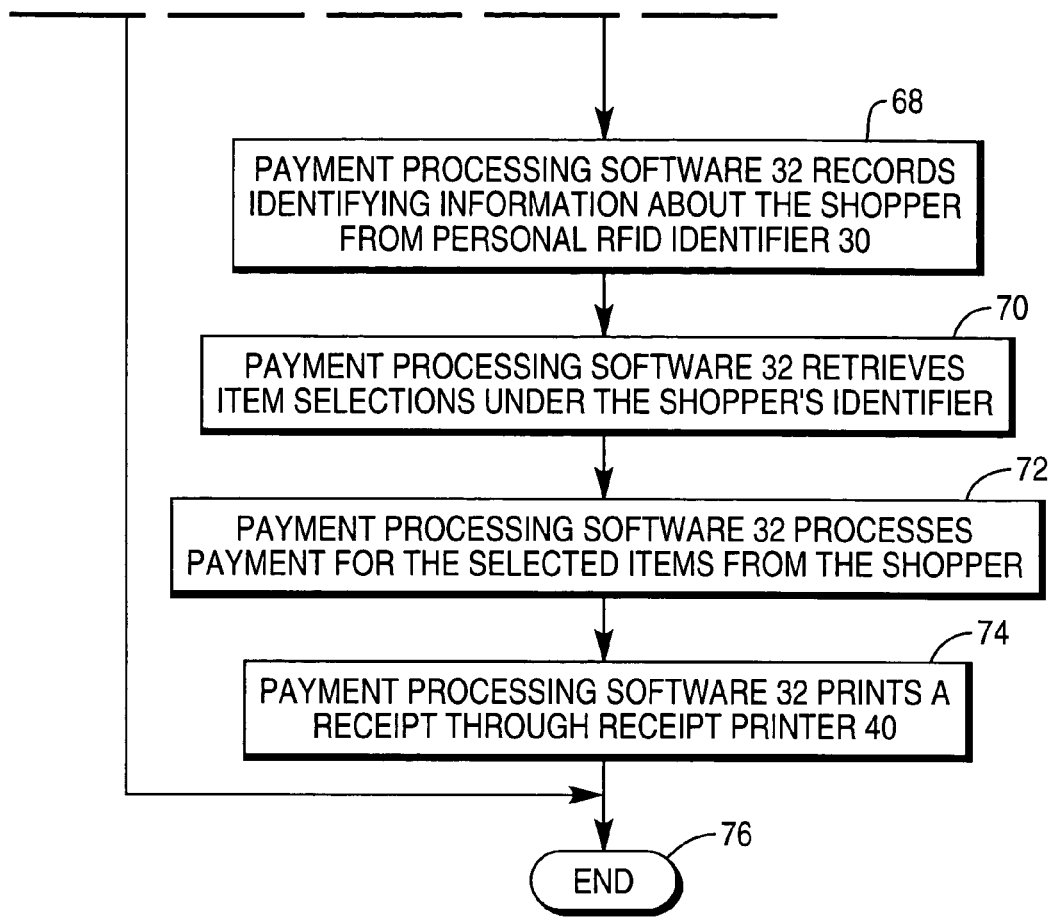

Turning now to FIG. 2, operation of system 10 is illustrated in detail beginning with Start 50.

In step 52, item recording software 18 at all of the item recording computers 12 waits for a shopper.

In step 54, item recording software 18 records item identification information about an item selected for purchase by the shopper. Item recording software 18 may obtain item identification information from bar code reader 20, keyboard 22, or RFID reader 24.

In step 56, item recording software 18 records identifying information about a shopper from personal RFID identifier 30.

In step 58, item recording software 18 stores the item identification information under the shopper's identifier in customer database 34 or in personal RFID identifier 30.

In step 60, item recording software 18 determines whether the shopper has provided payment information and instructions to automatically apply the payment information after each selection in customer database 34. If so, operation proceeds to step 62. Otherwise, operation proceeds to step 64.

In step 62, item recording software 18 automatically applies the payment information to the item selection. Operation proceeds to step 64. The shopper may walk out without having to checkout at payment processing computer 14.

In step 64, operation returns to step 42 until the shopper has finished selecting items.

In step 66, payment processing software 32 waits for the shopper to check out.

In step 68, payment processing software 32 records identifying information about the shopper from personal RFID identifier 30.

In step 70, payment processing software 32 retrieves item selections under the shopper's identifier from customer database 34 or personal RFID identifier 30.

In step 72, payment processing software 32 processes payment for the selected items from the shopper. The shopper leaves after completing payment.

In step 74, payment processing software 32 prints a receipt through receipt printer 40.

In step 76, operation ends.

Advantageously, the system 10 requires retailers to process fewer payments. It provides a savings on computer processing and receipt printing.

From a shopper's perspective, system 10 saves time by avoiding multiple payments during the course of a store or mall visit.

Although the invention has been described with particular reference to certain embodiments thereof, variations and modifications of the present invention can be effected within the spirit and scope of the following claims.

What is claimed is:

1. A shopping method comprising
   a) recording item identification information associated with an item selected for purchase by a shopper by an item recording computer in a store;
   b) recording identifying information about the shopper from an RFID identifier carried by the shopper by the item recording computer;
   c) storing the item identification information in a data file associated with the identifying information of the shopper by the item recording computer;
   d) recording the identifying information about the shopper from the RFID identifier by a checkout computer;
   e) retrieving the item identification information from the data file by the checkout computer; and
   f) processing payment for the item from the shopper by the checkout computer.

2. The method of claim 1, wherein step (f) comprises:
   f-1) obtaining payment information associated with the shopper from the data file; and
   f-2) automatically applying the payment information to the item.

3. The method of claim 1, wherein the data file is located in a server.

4. The method of claim 1, wherein the data file is located in the RFID identifier.

5. A shopping method comprising
   a) recording item identification information associated with a plurality of items selected for purchase by a shopper by a number of item recording computers in a store;
   b) recording identifying information about the shopper from an RFID identifier carried by the shopper by the item recording computers as the items are recorded;
   c) storing the item identification information in a data file associated with the identifying information of the shopper by the item recording computers;
   d) retrieving the item identification information from the data file by a checkout computer; and
   e) processing payment for the items from the shopper by the checkout computer.

6. The method of claim 5, wherein step e) comprises:
   e-1) processing payment as the items are recorded.

7. The method of claim 5, wherein step e) comprises:
   e-1) processing payment after all of the items are recorded.

8. A shopping system comprising:
   an item recording computer for recording item identification information associated with an item selected for purchase by a shopper in a store, for recording identifying information about the shopper from an RFID identifier carried by the shopper, and for storing the item identification information in a data file associated with the identifying information of the shopper; and
   a checkout computer for recording the identifying information about the shopper from the RFID identifier, for retrieving the item identification information from the data file, and for processing payment for the item from the shopper.

9. A shopping system comprising:
   means for identifying an item selected for purchase by a shopper in a store;
   an RFID identifier carried by the shopper;
   a computer for obtaining item identification information associated with the item from the identifying means, for recording identifying information about the shopper from the RFID identifier, and for storing the item identification information in a data file associated with the identifying information of the shopper; and
   a checkout computer for recording the identifying information about the shopper from the RFID identifier, for retrieving the item identification information from the data file, and for processing payment for the item from the shopper.

10. The system of claim 9, wherein the identifying means comprises an RFID reader.

11. The system of claim 9, wherein the identifying means comprises a bar code reader.

12. The system of claim 9, wherein the identifying means comprises a keyboard.

13. The system of claim 9, wherein the checkout computer obtains payment information associated with the shopper from the data file, and automatically applies the payment information to the item.

14. The system of claim 9, wherein the data file is located in a server.

15. The system of claim 9, wherein the data file is located in the RFID identifier.

* * * * *